Patented June 23, 1936

2,044,793

UNITED STATES PATENT OFFICE 2,044,793

PROCESS FOR CRYSTALLIZING CALCIUM SALTS OF ALDONIC ACIDS AND RESULTING PRODUCTS

Horace S. Isbell, Washington, D. C., assignor to the Government of the United States, represented by the Secretary of Commerce No Drawing. Application February 23, 1935, Serial No. 7,881

8 Claims. (Cl. 260—112)

(Granted under the act of March 3, 1883, as amended April 30, 1928; 370 O. G. 757)

The invention described herein may be manufactured and used by or for the Government for governmental purposes without the payment to me of any royalty thereon.

The present invention relates to calcium salts of the aldonic acids, and to a process of preparing the same.

It is an object of the present invention to provide new alkaline earth salts of the aldonic acids in the crystalline state, as well as a process for obtaining the same. Other objects of the invention will appear more fully hereinafter.

Crystalline forms of the calcium aldonates are of value, first, as medicinal agents, and second, as intermediate substances for use in the purification of the sugar acids or for the preparation of other salts, and there are many other uses.

Heretofore crystalline calcium salts of xylonic, glucoheptonic, idonic, allonic, and many other sugar acids have not been obtained in the crystalline state even though skillful investigators have sought to obtain the same. Thus, Kiliani (Ber. 19, 767; 1886), Emil Fischer (Ann. 270, 64, 70; 1892), Philippe (Ann. chim. phys. [8] 26,311; 1912), and others have tried in vain to obtain crystalline calcium α-glucoheptonate. Likewise, Tollens (Kurges Handbuch der Kohlenhydrate, 3rd ed., 1914, p. 684) and numerous others have attempted the preparation of crystalline calcium xylonate with negative results.

For example, it is highly desirable to have a crystalline form of calcium α-glucoheptonate because this salt can be made from dextrose by treatment with sodium cyanide in the presence of calcium chloride, followed by saponification of the nitrile with lime and precipitation of basic calcium glucoheptonate. From basic calcium glucoheptonate, a sirup containing the normal form is easily obtained by carbonation. The resulting product is a glassy amorphous solid of variable composition which is not readily purified by older methods and hence it was not suitable for medicinal use.

Likewise, calcium xylonate can be prepared from xylose by electrolytic oxidation in the presence of a bromide, according to the process set forth in my United States Patent No. 1,796,731, dated October 16, 1934, and separated by means of the basic calcium salt. This process provides a means for obtaining a solution of the salt, but it is desirable to eliminate the use of the basic salt so that the electrolytic process can be applied continuously, as in the case of the preparation of calcium gluconate.

In accordance with the present invention crystalline forms of the alkaline earth aldonates are obtained by a process comprising the step of crystallization, all as set forth in the following examples:

EXAMPLE I

*Preparation of crystalline calcium xylonate*

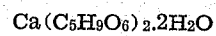

$$Ca(C_5H_9O_6)_2 \cdot 2H_2O$$

An aqueous solution of calcium xylonate, conveniently prepared from basic calcium xylonate by carbonation, is concentrated in vacuo to about 70 percent total solids and then heated to about 90° C. and allowed to cool at about 10° per hour. During the cooling process, crystalline calcium xylonate separates. The crystals are separated and dried at room temperature in air. The new product so obtained corresponds to the formula, $Ca(C_5H_9O_6)_2 \cdot 2H_2O$.

If it is desired to prepare calcium xylonate by the electrolytic oxidation of xylose, approximately 75 grams of xylose, 30 grams of calcium carbonate, 1 liter of water, and 3 ml. of bromine are placed in an electrolytic cell equipped with graphite electrodes and a mechanical stirrer. A direct current is then passed through the solution, using about ten volts. Electrolytic action is stopped when the solution does not show the presence of an appreciable quantity of reducing sugar. This requires about 28 ampere hours. The electrolyzed solution is filtered and evaporated to a sirup which is then seeded with crystalline calcium xylonate. Crystallization begins immediately; and when the solution becomes thick, the crystals are separated. The mother liquor can be used for preparing additional calcium xylonate by adding more xylose and calcium carbonate and repeating the process. The crude crystalline calcium xylonate so obtained may be used directly for the preparation of trihydroxyglutaric acid or for other purposes. If desired, it may be recrystallized from hot water. At 20° C. about 30 grams of crystalline calcium xylonate dissolve in 100 ml. of water.

Strontium xylonate can be prepared in similar manner, but at room temperature it is difficult to bring it to crystallization without seed. If a hot concentrated solution is slowly cooled, crystallization occurs spontaneously at about 50° C.

EXAMPLE II

*Preparation of crystalline calcium α-glucoheptonate*

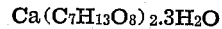

$$Ca(C_7H_{13}O_8)_2 \cdot 3H_2O$$

An aqueous solution of calcium α-glucoheptonate, conveniently prepared from basic calcium α-glucoheptonate by carbonation, is evaporated to a thick sirup which is allowed to stand with occasional stirring at about 50° C. until crystallization begins. Under these conditions the product forms prismatic crystals which are easily separated from the mother liquor. The analysis of the new salt, after drying in air at room temperature, corresponds to the formula, $Ca(C_7H_{13}O_8)_2.3H_2O$. The substance gives up its water of crystallization by more vigorous drying. At room temperature or lower temperatures, a product which crystallizes in needles is obtained, and this is more highly hydrated.

EXAMPLE III

*Calcium Gulonate*

$Ca(C_6H_{11}O_7)_2$

Crystalline anhydrous calcium gulonate is prepared by slowly evaporating an aqueuos solution of calcium gulonate at a temperature above 30° C. and preferably below 90° C. At such temperature, crystallization of the anhydrous form occurs spontaneously. The crystals so obtained can be used for nucleation of other solutions in which the crystals are grown at temperatures only slightly above room temperature. At room temperature (about 25° C.) and below, the hydrated modification of calcium gulonate, first prepared by Fischer and Stahel (Ber. 24, 528; 1891) is obtained. My new product differs from the hydrated calcium gulonate of Fischer and Stahel in that it forms short, thick, anhydrous crystals which may be separated readily from the mother liquors, whereas, the said known product crystallizes in clusters of needle-like crystals which are difficult to separate.

The invention may be variously modified and embodied within the scope of the subjoined claims the foregoing proportions being approximate only and set forth for purposes of illustration.

Having thus described my invention, what I claim is:

1. The process for the purification of a calcium aldonate from the group consisting of calcium xylonate, calcium α-glucoheptonate and anhydrous calcium gulonate, which consists in the crystallization of said substance from an aqueous solution at a temperature above 30° C., followed by separation of the crystals from the mother liquor.

2. The process for the preparation of crystalline calcium xylonate, which consists in slowly cooling a supersaturated aqueous solution and then separating the resulting crystals.

3. The process for the purification of calcium xylonate, which consists in the crystallization of calcium xylonate, corresponding to the formula, $Ca(C_5H_9O_6)_2.2H_2O$, from an aqueous solution containing calcium xylonate.

4. The process for the purification of calcium α-glucoheptonate, which consists in the crystallization of calcium α-glucoheptonate from aqueous solution.

5. The process for the purification of crystalline anhydrous calcium gulonate, which comprises the crystallization of calcium gulonate, corresponding to the formula, $Ca(C_6H_{11}O_7)_2$, from an aqueous solution containing calcium gulonate, at a temperature above approximately 30° C. and below approximately 90° C.

6. Crystalline calcium xylonate corresponding to the formula, $Ca(C_5H_9O_6)_2.2H_2O$.

7. Crystalline calcium α-glucoheptonate corresponding to the formula, $Ca(C_7H_{13}O_8)_2.3H_2O$.

8. Crystalline calcium gulonate corresponding to the formula, $Ca(C_6H_{11}O_7)_2$.

HORACE S. ISBELL.